(12) United States Patent
Wusk et al.

(10) Patent No.: US 10,300,675 B2
(45) Date of Patent: May 28, 2019

(54) LIGHTWEIGHT FLEXIBLE THERMAL PROTECTION SYSTEM FOR FIRE PROTECTION

(71) Applicant: The United States of America, as represented by the Administrator of the National Aeronautics and Space Administration, Washington, DC (US)

(72) Inventors: Mary E. Wusk, Yorktown, VA (US); Anthony M. Calomino, Cleveland, OH (US); Kamran Daryabeigi, Virginia Beach, VA (US); Walter E. Bruce, III, Yorktown, VA (US); Joshua M. Fody, Hampton, VA (US); Stephen D. Miller, Flagstaff, AZ (US); Steven P. Vague, Flagstaff, AZ (US)

(73) Assignee: THE UNITED STATES OF AMERICA AS REPRESENTED BY THE ADMINITRATOR OF NASA, Washington, DC (US)

( * ) Notice: Subject to any disclaimer, the term of this patent is extended or adjusted under 35 U.S.C. 154(b) by 113 days.

(21) Appl. No.: 15/429,239

(22) Filed: Feb. 10, 2017

(65) Prior Publication Data
US 2017/0151749 A1    Jun. 1, 2017

Related U.S. Application Data

(63) Continuation-in-part of application No. 14/516,951, filed on Oct. 17, 2014.
(Continued)

(51) Int. Cl.
*B32B 5/02*    (2006.01)
*B32B 5/06*    (2006.01)
(Continued)

(52) U.S. Cl.
CPC ............ *B32B 5/06* (2013.01); *B32B 5/02* (2013.01); *B32B 5/024* (2013.01); *B32B 5/026* (2013.01);
(Continued)

(58) Field of Classification Search
CPC ... B32B 2307/3065; B32B 27/06; B32B 5/06; B32B 7/08; B32B 7/12
(Continued)

(56) References Cited

U.S. PATENT DOCUMENTS 4,509,559 A * 4/1985 Cheetham ............... E04B 1/94
                                               138/121
4,567,696 A * 2/1986 Malet .................... E04H 15/22
                                               52/2.24

(Continued)

OTHER PUBLICATIONS

Interagency Fire Shelter Task Group, "Wildland Fire Shelter," 45 pages, catalog Sep. 25, 2008, at http://www.fs.fed.us/t-d/programs/fire/documents/shelhist.pdf.

*Primary Examiner* — Lawrence D Ferguson
(74) *Attorney, Agent, or Firm* — Andrea Z. Warmbier; Robin W. Edwards; Mark P. Dvorscak

(57) ABSTRACT

A portable thermal protection system is provided for protecting equipment, facilities, and personnel in a region from a high intensity incident heat source. The system can be formed as a sleeping bag, a tent, a blanket, a sleeping bag, a vertical barrier, a curtain, a flexible rollup doorway, or a wrap. The system includes an outer textile layer first layer, an insulator second layer, and a non-porous film third layer which forms a gas barrier. Some embodiments include a fourth layer formed of a material to provide radiation protection. In some embodiments, the first and/or second layers are integrally formed with the materials that reflects radiation. The layers are joined together by high-temperature adhesives, stitching, needling, or tacking.

20 Claims, 6 Drawing Sheets

Related U.S. Application Data

(60) Provisional application No. 62/294,377, filed on Feb. 12, 2016.

(51) Int. Cl.

| | | |
|---|---|---|
| *B32B 7/12* | (2006.01) | |
| *B32B 7/08* | (2019.01) | |
| *B32B 27/06* | (2006.01) | |
| *B32B 5/22* | (2006.01) | |
| *B32B 5/24* | (2006.01) | |
| *B32B 5/26* | (2006.01) | |
| *B32B 15/04* | (2006.01) | |
| *B32B 15/12* | (2006.01) | |
| *B32B 15/14* | (2006.01) | |
| *B32B 15/20* | (2006.01) | |
| *B32B 27/10* | (2006.01) | |
| *B32B 27/12* | (2006.01) | |
| *B32B 27/28* | (2006.01) | |
| *B32B 27/32* | (2006.01) | |
| *B32B 27/36* | (2006.01) | |
| *B32B 29/02* | (2006.01) | |

(52) U.S. Cl.
CPC .................. *B32B 5/22* (2013.01); *B32B 5/24* (2013.01); *B32B 5/26* (2013.01); *B32B 7/08* (2013.01); *B32B 7/12* (2013.01); *B32B 15/04* (2013.01); *B32B 15/12* (2013.01); *B32B 15/14* (2013.01); *B32B 15/20* (2013.01); *B32B 27/06* (2013.01); *B32B 27/10* (2013.01); *B32B 27/12* (2013.01); *B32B 27/281* (2013.01); *B32B 27/285* (2013.01); *B32B 27/288* (2013.01); *B32B 27/322* (2013.01); *B32B 27/36* (2013.01); *B32B 29/02* (2013.01); *B32B 2250/03* (2013.01); *B32B 2250/04* (2013.01); *B32B 2250/05* (2013.01); *B32B 2255/02* (2013.01); *B32B 2255/10* (2013.01); *B32B 2255/205* (2013.01); *B32B 2262/101* (2013.01); *B32B 2262/105* (2013.01); *B32B 2262/106* (2013.01); *B32B 2264/108* (2013.01); *B32B 2307/304* (2013.01); *B32B 2307/3065* (2013.01); *B32B 2307/416* (2013.01); *B32B 2307/546* (2013.01); *B32B 2307/718* (2013.01); *B32B 2307/7242* (2013.01); *B32B 2307/732* (2013.01); *B32B 2571/00* (2013.01)

(58) Field of Classification Search
USPC .................................................. 428/212, 220
See application file for complete search history.

(56) References Cited

U.S. PATENT DOCUMENTS

| | | |
|---|---|---|
| 5,921,388 A | 7/1999 | Petrilli et al. |
| 6,881,506 B2 | 4/2005 | Anderson et al. |
| 7,084,083 B2 | 8/2006 | Anderson et al. |
| 7,128,207 B2 | 10/2006 | Anderson et al. |
| 2004/0087232 A1 | 5/2004 | Anderson et al. |
| 2005/0019619 A1 | 1/2005 | Anderson et al. |
| 2005/0064165 A1* | 3/2005 | Cleveland ................ B32B 5/18 428/292.1 |
| 2005/0136760 A1 | 6/2005 | Anderson et al. |
| 2009/0104419 A1* | 4/2009 | Dumas ..................... B32B 5/26 428/215 |
| 2009/0188539 A1 | 7/2009 | Hollinger |
| 2012/0174748 A1 | 7/2012 | Landi |

* cited by examiner

LIGHTWEIGHT FLEXIBLE THERMAL PROTECTION SYSTEM FOR FIRE PROTECTION

CROSS-REFERENCE TO RELATED PATENT APPLICATION(S)

This patent application is a continuation-in-part of and claims priority to U.S. patent application Ser. No. 14/516,951, which was filed on Oct. 17, 2014. This patent application also claims the benefit of and priority to U.S. Provisional Patent Application No. 62/294,377, filed on Feb. 12, 2016. All of the foregoing applications are hereby incorporated by reference in their entirety.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

FIELD OF THE INVENTION

The present invention relates to a lightweight flexible thermal protection system for protecting equipment, facilities, and personnel in a region from a high intensity incident heat source.

BACKGROUND OF THE INVENTION

Combating fires is an inherently dangerous effort. Firefighters working within a building or on the ground are routinely exposed to unpredictable, dynamic, and life threatening conditions. A particularly alarming situation can arise when rapidly changing or aggressive conditions result in the loss of an escape route. In an entrapment situation, personnel are caught by the dynamics of an advancing fire, and it is possible that their only chance of survival is the use of an emergency fire shelter. Emergency fire shelters were developed starting in the late 1950's as a last resort one person tent, which was designed primarily to repel thermal radiation and trap breathable air. Several alterations to the original design have been made over the years, including a major retrofit in 2001.

The fire shelter currently in use by the United States Forest Service is called the M2002. The M2002 performs very well as a reflector of thermal radiation. FIG. 1 illustrates the design of the existing M2002 fire tent. The current M2002 is designed like a tent so the shelter walls are not in direct contact with the firefighter inside.

A lightweight flexible thermal protection system is provided herein which presents improvements to existing thermal protection system state of art. Other features and advantages will become apparent upon a reading of the attached specification, in combination with a study of the drawings.

SUMMARY OF THE INVENTION

A portable, lightweight, flexible thermal protection system is provided for protecting equipment, facilities and personnel in a region from a high intensity incident heat source. The system can be formed as a sleeping bag, a tent, a blanket, a vertical barrier, a curtain, a flexible rollup doorway, or a wrap. The system has a first layer formed from an outer refractory textile, a second layer formed from insulator material or materials, and a third layer formed from a non-porous film which forms a gas barrier. Some embodiments of the system include a fourth layer formed of a material to provide radiation protection. In some embodiments, the first and/or second layers are integrally formed with the materials that reflect radiation. The layers are joined together by high-temperature adhesives, sintering, stitching, needling, or tacking.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENTS

Figure 1:
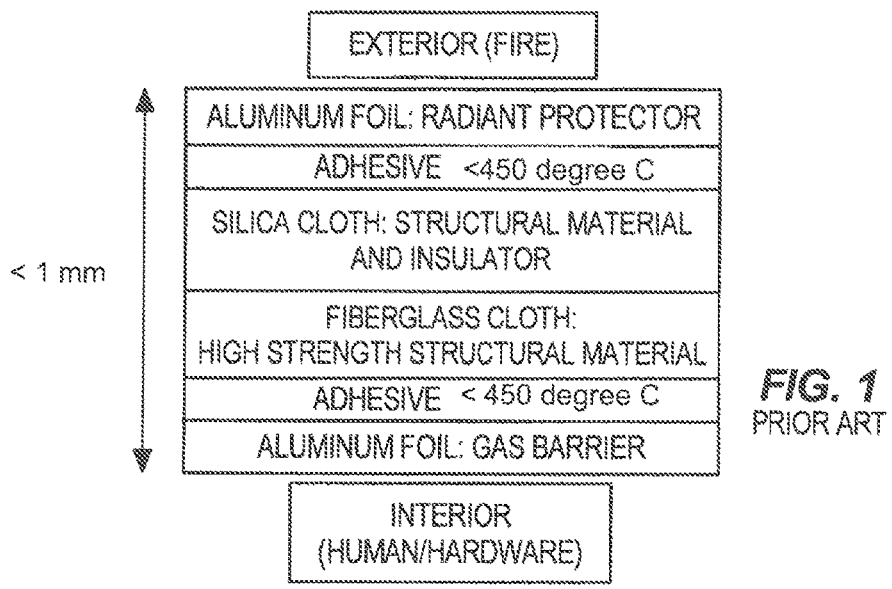
FIG. 1 is a diagram showing the components of a prior art fire shelter currently in use by the United States Forest Service called the M2002.
Figure 2:
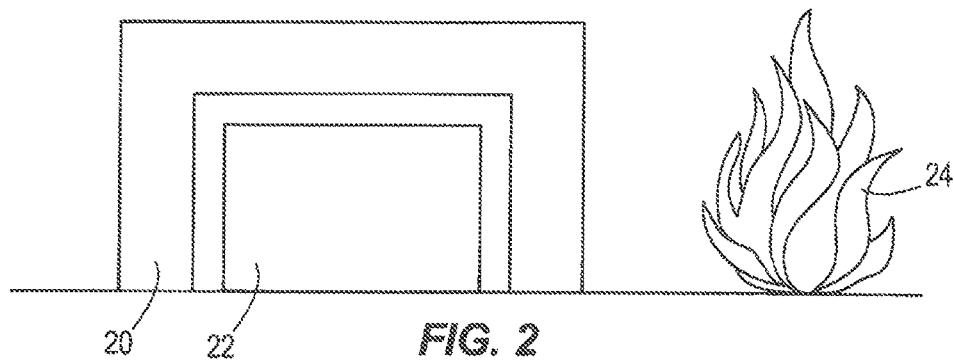
FIGS. 2 and 3 are diagrams of a portable, lightweight, flexible thermal protection system which incorporates the features of the present invention, and being shown in use.
Figure 3:
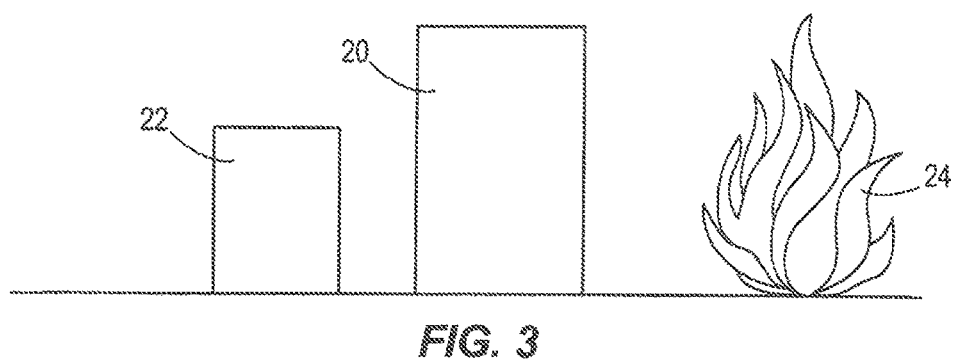

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein. Therefore, unless otherwise noted, features disclosed herein may be combined together to form additional variants that were otherwise not shown for purposes of brevity.

A lightweight flexible thermal protection system 20 is provided which temporarily provides a region 22 protected against a high intensity incident heat source 24 that can have both a convective and radiant component. The thermal protection system 20 may be used to cover the region 22, or provide a barrier between the region 22 and the high intensity incident heat source 24. The thermal protection system 20 serves as a temporary heat barrier that separates and protects the region 22 from the high intensity incident heat source 24. The thermal protection system 20 may be in direct contact with personnel, equipment, or facilities within the region 22, or may be spaced from personnel, equipment, or facilities within the region 22. The thermal protection system 20 may be used in any instance where fire protection is needed, such as for example, by forest and wild land fire fighters, by fire fighters in a building, to separate rooms in a building, in an aircraft, or surrounding aircraft components. The thermal protection system 20 is flexible so that it can be wrapped around components in the region 22, such as an aircraft nacelle. For the uses where the thermal protection system 20 is portable, the thermal protection system 20 is flexible and compressible and/or foldable so that the thermal protection system 20 can be compacted into a small volume to facilitate easy transport and personal portability. The thermal protection system 20 uses lightweight and flexible layers 26, 28, 30 which meet strict packing volume and weight limits, while providing protection from convective heat flux and temperatures. The thermal protection system 20 is resistant to direct flame, high temperatures, and permeation of hot gases.

Figure 4:
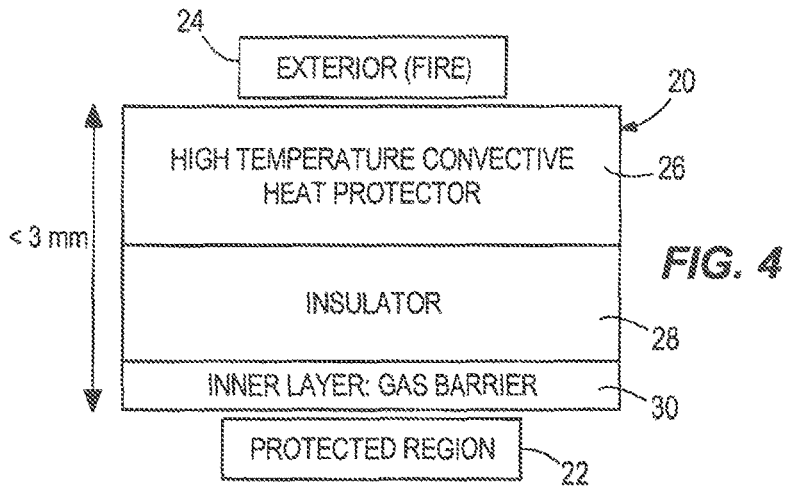
FIG. 4 is a diagram showing the components of the portable, lightweight, flexible thermal protection system of FIGS. 2 and 3.
Figure 5:
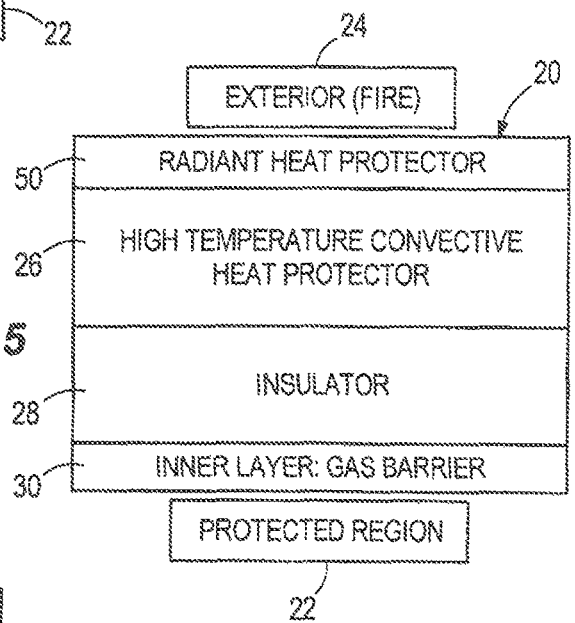
FIG. 5 is a diagram showing the components of the portable, lightweight, flexible thermal protection system according to a first alternate embodiment.
Figure 6:
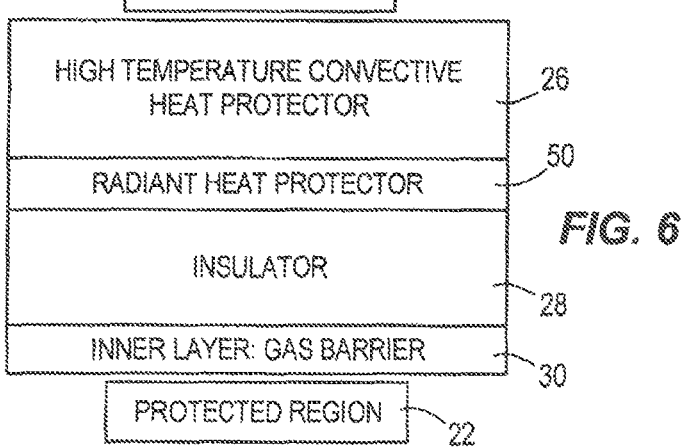
FIG. 6 is a diagram showing the components of the portable, lightweight, flexible thermal protection system according to a second alternate embodiment.

As shown in FIG. 4, the thermal protection system 20 is formed of flexible first, second and third layers 26, 28, 30 which are joined together, namely: first layer 26 formed of flexible refractory textile in the form of a high temperature convective heat protector, second layer 28 formed of a thin film insulator material or materials, and third layer 30 formed of a gas barrier. As shown in FIGS. 5 and 6, a fourth flexible layer 50 may be incorporated to provide radiation protection. The thermal protection system 20 handles external temperatures of up to 3000 degrees F. for a duration of up to ten minutes.

As shown in FIG. 4, the first layer 26 is directly exposed to the intense heat of the incident heat source 24. The second layer 28 is between the first layer 26 and the third layer 30. The third layer 30 is proximate to the region 22. The region 22 is positioned under, in, or proximate to the thermal protection system 20. The thermal protection system 20 provides passive thermal protection through the layered use of the first, second and third layers 26, 28, 30. The first, second and third layers 26, 28, 30 impede the absorption and transfer of heat through its thickness. The first, second and third layers 26, 28, 30 are joined together by suitable means which extend the temperature capability of the thermal protection system 20 to be compatible with high-convective heat transfer loads, such as for example, but not limited to, high-temperature adhesives, high-temperature stitching, high-temperature needling, or high-temperature tacking.

The first layer 26 is formed from a porous outer textile layer. The first layer 26 is formed by weaving, braiding or knitting together refractory ceramic, graphite or glass fibers, tows, or yarns. The first layer 26 primarily provides handling and mechanical durability to the thermal protection system 20 when packed, deployed, and placed into service. The first layer 26 provides the first resistance to heat absorption through reduced solid conductivity, heat rejecting phase transformation materials, or enhanced radiation reflectance materials or coatings. The first layer 26 reflects most of the radiant thermal energy similar to M2002 fire shelter currently in use by the United States Forest Service.

The second layer 28 is composed of a single layer or multiple layers of thin materials that manage thermal transfer of heat through the thermal protection system 20. The second layer 28 is highly efficient at reducing conductive heat transfer. The second layer 28 minimizes the absorbed heat of the overall thermal protection system 20 through impedance of radiation, gas convection, and solid conduction. Examples of materials that imped gas convection can include both organic and inorganic aerogel films (such as those disclosed in U.S. patent application Ser. Nos. 12/571,049; 13/756,855; 14/168,830 which disclosures are incorporated by reference in their entireties), films that manage heat absorption through decomposition or phase transformation, low conductivity fibrous felts and papers constructed of glass, ceramics, graphite, cellulous, or organic materials that char or sublime. The second layer 28 may also employ "active" insulating materials that may degrade and provide a transpiration cooling effect from pyrolysis gases released during the decomposition process or may employ intumescent materials that "swell-up" when heated providing additional thermal conductive heat transfer resistance.

Figure 7:
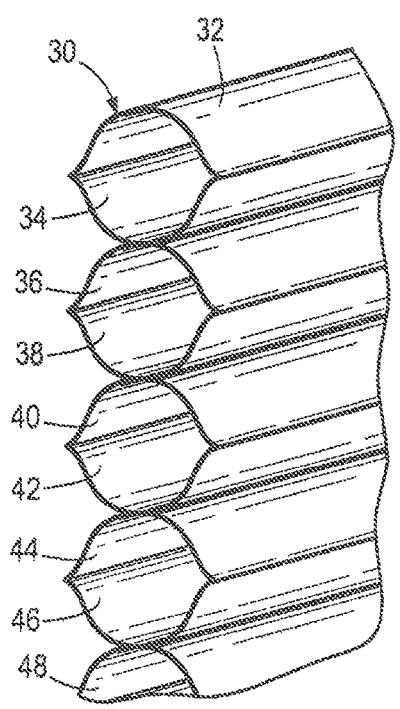
FIG. 7 is a partial perspective view of inflatable insulator cells used in an embodiment of invention.

The third layer 30 forms an inner liner and is proximate to the region 22. The third layer 30 is a non-porous film that serves as a gas barrier layer that is substantially impermeable to gas and prevents the entrance of hot gas and/or decomposing gases into the region 22. The third layer 30 keeps hot gas away from the region 22 and can be used to trap breathable air inside the thermal protection system 20. The third layer 30 also provides additional insulation against heat transfer to the region 22 by using multiple joined films 32-48 et seq. that form inflatable insulator cells as shown in FIG. 7. In one embodiment, the third layer or gas barrier layer comprises aluminum layer, and adhesive layer and a fiberglass cloth layer.

The thermal protection system 20 is highly resistance to direct flame, high temperatures, and hot, high-velocity gas by providing an effective thermal conduction barrier.

The thermal protection system 20 preferably has a thickness of less than 3.5 mm when the thermal protection system 20 is packed into a portable condition. The second layer 28 may be compressed by vacuum-bagging or other compression technique to reduce the overall thickness of the thermal protection system 20 in a non-deployed condition (for stowage and transportation by a vehicle, person or animal).

An alternate embodiment of the thermal protection system 20 is shown in FIG. 5 and which includes the fourth layer 50. The fourth layer 50 may be any material which provides radiation protection. For example, the fourth layer 50 may be formed of thin polymeric films with metallic or optically reflective coatings, fibrous felts or mats modified with radiation reflecting (opacified) particulates or photonic deflectors. The fourth layer 50 may be thin metal coating on the exterior surface of the first layer 26, or may be a separate thin metal layer attached to the first layer 26.

Another alternate embodiment of the thermal protection system 20 is shown in FIG. 6 and which includes the fourth layer 50. The fourth layer 50 may be any material which provides radiation protection. For example, the fourth layer 50 may be formed of thin polymeric films with metallic or optically reflective coatings, fibrous felts or mats modified with opacified particulates or photonic deflectors. In this embodiment, the fourth layer 50 is formed of a separate layer between the first layer 26 and the second layer 28.

Alternatively, the materials comprising the fourth layer 50 may be integrated into the first layer 26 or may be integrated into the second layer 28. As such, the radiation protection features of the fourth layer 50 are provided by the first layer 26 or the second layer 28.

Figure 8:
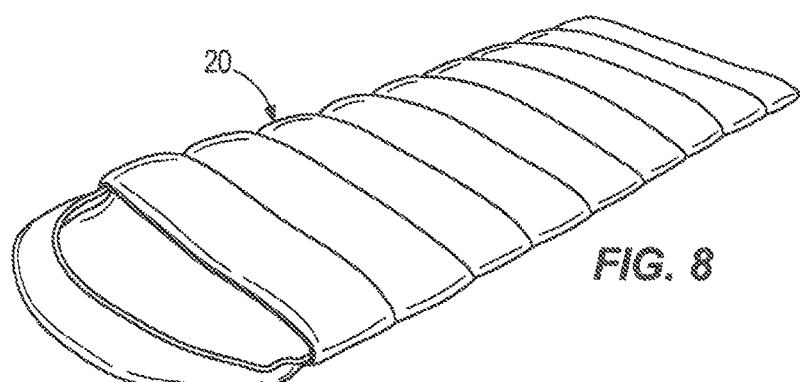
FIG. 8 shows a sleeping bag which may form the portable, lightweight, flexible thermal protection system.
Figure 9:
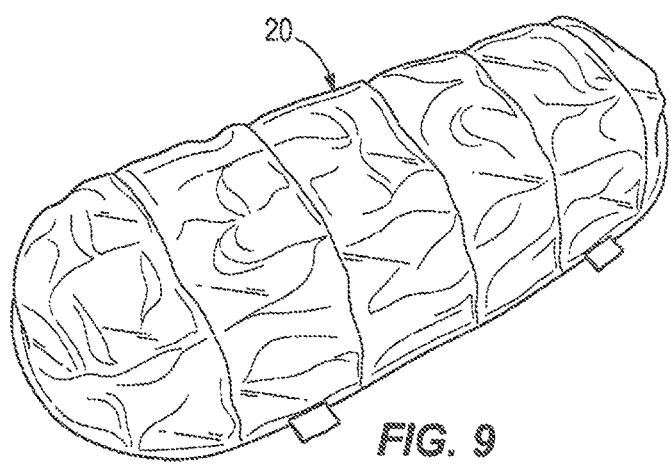
FIG. 9 shows a tent which may form the portable, lightweight, flexible thermal protection system.

The thermal protection system 20 may take a variety of forms, such as a sleeping bag, a tent, a blanket, a vertical barrier, a curtain, a flexible rollup doorway, a wrap which wraps around a component to be protected, such as a nacelle of an aircraft, etc. A sleeping bag is shown in FIG. 8 and a tent is shown in FIG. 9 as examples of the thermal protection system 20. The tent has a wall formed from the thermal protection system 20, and which may include other layers (not shown), which contacts the ground and surrounds the region 22 in which the personnel, equipment, or facilities are located. The wall may or may not be in direct contact with the region 22 under the tent. The sleeping bag has a wall formed from the thermal protection system 20, and which may include other layers (not shown), which completely surrounds the region 22. At least part of the wall will be in direct contact with the personnel, equipment, or facilities in the region 22.

In an additional embodiment, the thermal protection system incorporates into the insulation a material which undergoes "intumescence" (a physical expansion) upon heating. The intumescent material may comprise expandable graphite, perlite, polymer, or other inorganic material. Expandable flake graphite, also known as intumescent flake graphite, or simply "expandable flake", is a form of intercalated graphite. Intercalation is a process whereby an intercallant material is inserted between the graphene layers of a graphite crystal or particle. After intercalation the resulting graphite material takes on new properties that are a function of the intercallant and the way it associates with the host (graphite) species. Both physical and chemical properties, including crystallographic structure, surface area, density, electronic properties, intumescent behavior, chemical reactivity, etc., may be affected by the intercallant. A wide variety of chemical species have been used to intercalate graphite materials. These include halogens, alkali metals, sulfate, nitrate, various organic acids, aluminum chloride, ferric chloride, other metal halides, arsenic sulfide, thallium sulfide, etc.

The intumescent material may be integrated into the insulation in one of two ways.

The intumescent material may be integrated by adding intumescent particles (e.g. expandable graphite flakes) into a fiberglass batting insulation. Optionally, opacified particles, aerogels, or other photonic deflectors may be incorporated into the insulation batting in addition to the intumescent particles. Since the insulation batting itself is physically pushed apart during the expansion of the graphite, these additives would also be spaced further apart and may enhance their benefit.

The intumescent material may also be integrated into the insulation by using Techno-Fire® from Technical Fibre Products. Tecnofire® is manufactured from exfoliating graphite, high temperature resistant mineral fibre, a small amount of organic binder and, in some cases, additional particulates, fibres or active ingredients such as ATH. ATH (alumina trihydrate) undergoes an endothermic reaction, releasing water and acting as a suppressant to surface spread of flame, further improving the fire performance of the Tecnofire®. The Techno-Fire® would be placed just beneath the outer shell fabric layer so that it would receive rapid heating. Rapid heating causes the graphite to expand more rapidly and extensively.

The use of intumescent material provides multiple benefits. First, a small manageable fire shelter can expand into a thicker shelter when it is needed most (e.g. upon heating). This expansion increases the conductive path length through the shelter material, providing better insulation. Second, there is an absorption of energy required by the graphite in order to expand. This absorption keeps the material cooler for the short period of time that the expansion is taking place, which results in a reduced shelter wall temperature after heating.

Figure 10:
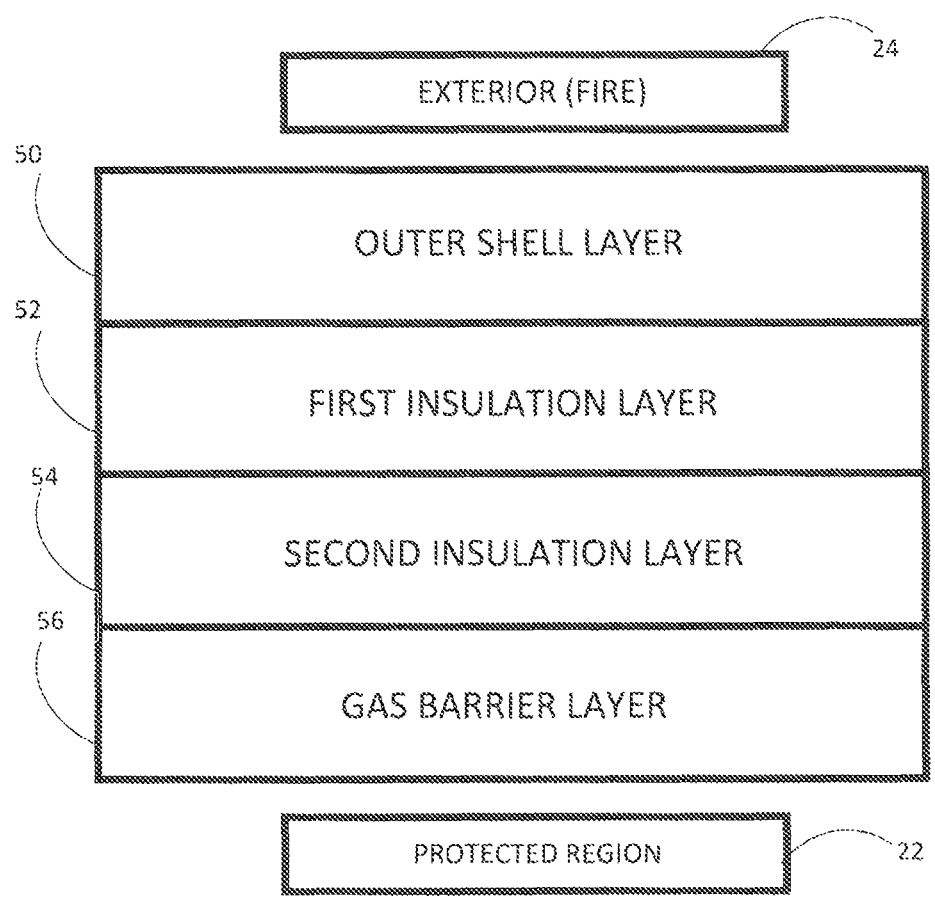
FIG. 10 is a diagram showing the components of the portable, lightweight, flexible thermal protection system according to an alternate embodiment.

As shown in FIG. 10, one embodiment includes a thermal protection system comprising an outer shell layer 50, a first insulation layer 52, a second insulation layer 54, and a gas barrier layer 56. The first insulation layer 52 may comprise intumescent material and the second insulation layer 54 would not include intumescent material.

Figure 11:
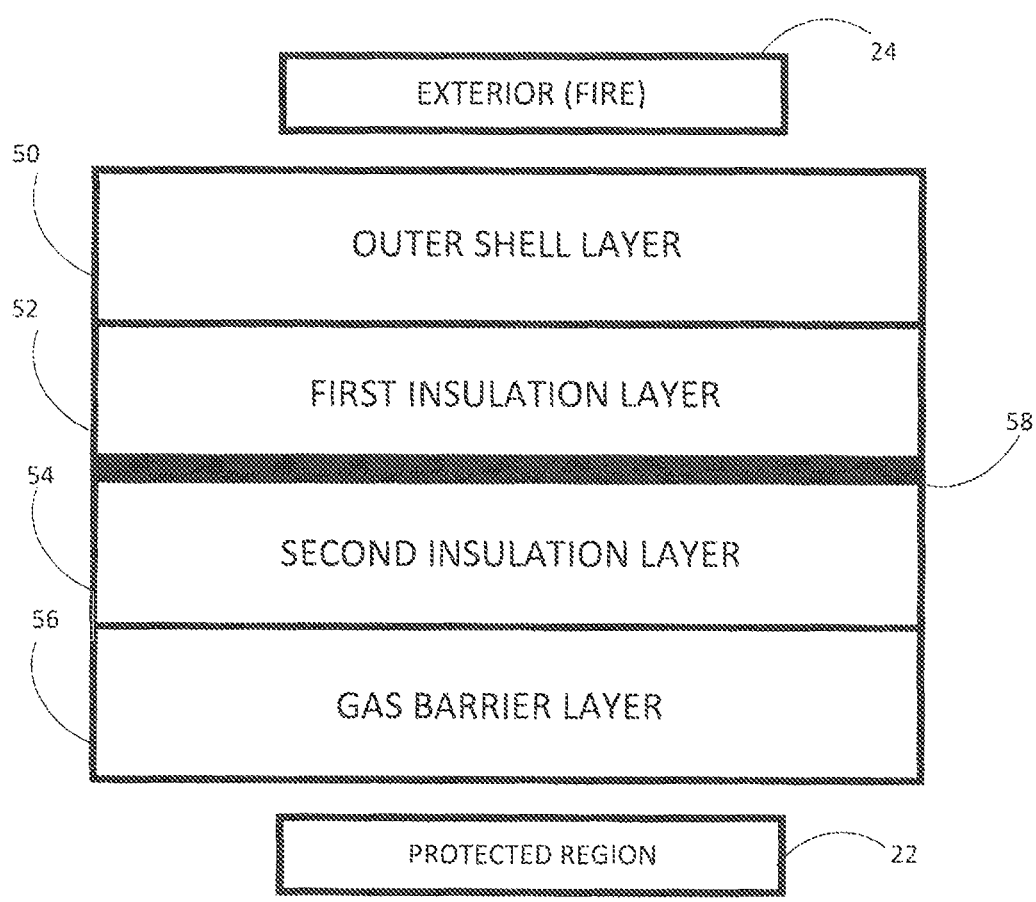
FIG. 11 is a diagram showing the components of the portable, lightweight, flexible thermal protection system according to an alternate embodiment.

As shown in FIG. 11, another embodiment includes a thermal protection system wherein a thin substantially impermeable polymer film is disposed between the first and second layers of insulation. The thin polymer film has been shown to enhance the performance of the layup with the same insulations (but no polymer film) by 15% or more. The film itself does not have to be very thick (e.g. about 1 thousandths of an inch) and it can be thinner for some materials. The thin film material should be substantially impermeable and capable of withstanding high temperatures (at least about 350° C.) before decomposing. Such materials include PEEK (polyether ether keytone), aluminized PEEK, PTFE (polytetrafluoroethylene, Dupont produces this material as Teflon), Polyimide (Dupont produces this material as Kapton), aluminized mylar (polyester), Nomex XF (PEEK film and Nomex scrim), Fiberglass reinforced PTFE (Teflon), Dunlam 715, single layer of cast PTFE, double layer of cast PTFE, and cast PTFE, The material may be aluminized (coated in a very thin layer of aluminum by way of vapor deposition), or not.

Figure 12:
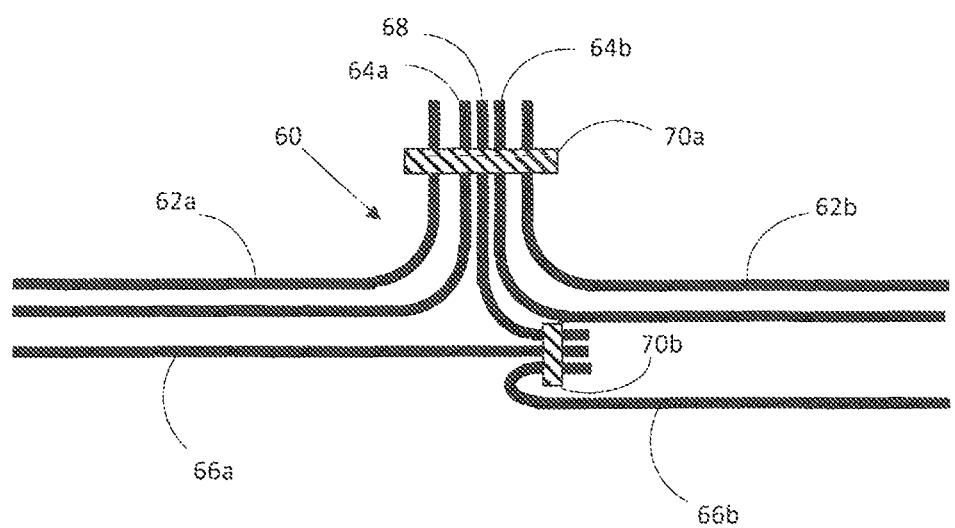
FIG. 12 is a diagram showing the components of an embodiment of a seam of the present invention.

FIG. 12 also shows a method of joining the layers of the thermal protection system at a seam 60 to further prevent failures that may occur at seams located throughout the system. The system comprises of a first outer layer (62a, 62b), an insulation layer (64a, 64b) which may comprise a single or multiple sub-layers, a gas barrier layer (66a, 66b) and a tethering layer (68). The tethering layer 68 functions to tack the gas barrier layer to the remaining layers of the system, and may comprise silica cloth in one embodiment of the invention. The first outer layer (62a, 62b), insulation layer (64a, 64b) and a first end of the tethering layer (68) are sewn together with thread 70a. A second end of the tethering layer 68 is sewn to the gas barrier layer (66a, 66b) with thread 70b. The thread may comprise Teflon-coated quartz thread, stainless steel thread, or any other thread as would be known to those skilled in the art.

While preferred embodiments of the present invention are shown and described, it is envisioned that those skilled in the art may devise various modifications of the present invention without departing from the spirit and scope of the appended claims.

What is claimed is:

1. A thermal protection system for protecting a region from a heat source, the system comprising:
   an outer shell layer, to reflect radiant thermal energy;
   a first insulation layer disposed beneath the outer shell layer, wherein
   said first insulation layer comprises an intumescent material integrated into the first insulation layer, and
   said first insulation layer with the intumescent material integrated thereinto undergoing an expansion upon heating by the heat source;
   a second insulation layer;

a gas barrier layer;
a tethering layer;
one or more seams joining said outer shell layer, said first insulation layer, said second insulation layer, said gas barrier layer, and said tethering layer together.

2. The thermal protection system of claim 1, wherein said first insulation layer comprises graphite flakes as the intumescent material disposed in a fiberglass batting insulation, and
the intumescent material is just beneath the outer shell layer so as to receive heat from the heat source.

3. The thermal protection system of claim 1, wherein the intumescent material of said first insulation layer is incorporated into a plurality of expandable felts or fabrics.

4. The thermal protection system of claim 2, wherein the the graphite flakes are intercalated with additives which inhibit the transfer of heat such as aerogels, opacified particles, or photonic deflectors.

5. The thermal protection system of claim 1, wherein said tethering layer comprises silica cloth.

6. The thermal protection system of claim 1, wherein the one or more seams comprise a first thread and a second thread, wherein at least one of said first and second threads comprise at least one of a polytetrafluoroethylene (PTFE)-coated quartz thread and a stainless steel thread.

7. The thermal protection system of claim 1, wherein said outer shell layer comprises a first sub-layer comprising aluminum forming a reflective coating, a second sub-layer comprising an adhesive and a third sub-layer comprising silica.

8. The thermal protection system of claim 1, wherein the outer shell layer further comprises at least one of metallic films, polymeric films with reflective coatings, opacified particulates, and photonic deflectors.

9. The thermal protection system of claim 1, wherein the thermal protection system comprises one of a fire shelter, a sleeping bag, a tent, a blanket, a vertical barrier, a curtain, a flexible rollup doorway, and a wrap.

10. The thermal protection system of claim 1, wherein the thermal protection system is compressible to less than about 250 cubic inches.

11. The thermal protection system of claim 1, further comprising a polymeric film layer disposed between the first and second insulation layers to inhibit gas convection and advection between the insulators.

12. The thermal protection system of claim 11, wherein the polymeric film layer comprises a plurality of polymeric films layers.

13. The thermal protection system of claim 11, wherein the polymeric film layer comprises a material that is impermeable to gas penetration and capable of withstanding temperatures at least about 350° C. before decomposing.

14. The thermal protection system of claim 11, wherein the polymeric film layer comprises polyether ether keytone (PEEK), aluminized PEEK, polytetrafluoroethylene (PTFE), polyimide, aluminized polyester, PEEK film and Nomex scrim, fiberglass reinforced PTFE, a single layer of cast PTFE, a double layer of cast PTFE, or cast PTFE.

15. A thermal protection system for protecting a region from a heat source, the system comprising:
an outer shell layer, to reflect radiant thermal energy;
a first insulation layer, wherein said first insulation layer comprises an intumescent material;
a second insulation layer;
a gas barrier layer;
a tethering layer having a first end and a second end; and
a seam including both the first end and the second end of the tethering layer, the seam comprising
a first thread, wherein said first thread joins individual layers of said outer shell layer, said first insulation layer, said second insulation layer and said first end of said tethering layer together, and
a second thread, wherein said second thread joins said second end of said tethering layer and said gas barrier layer together.

16. The thermal protection system of claim 15, wherein said tethering layer comprises silica cloth.

17. The thermal protection system of claim 16, wherein at least one of said first and second threads comprise at least one of a polytetrafluoroethylene (PTFE)-coated quartz thread and a stainless steel thread.

18. The thermal protection system of claim 17, wherein the thermal protection system comprises one of a fire shelter, a sleeping bag, a tent, a blanket, a vertical barrier, a curtain, a flexible rollup doorway, and a wrap.

19. The thermal protection system of claim 18, wherein the thermal protection system is compressible to less than about 225 cubic inches.

20. The thermal protection system of claim 19, wherein said outer shell layer comprises a first sub-layer comprising aluminum forming a reflective coating, a second sub-layer comprising an adhesive and a third sub-layer comprising silica.

* * * * *